(12) United States Patent
Scharf-Bergmann

(10) Patent No.: US 12,043,880 B2
(45) Date of Patent: Jul. 23, 2024

(54) METHOD FOR PRODUCING THERMALLY PROCESSED MATERIAL

(71) Applicant: NORSK HYDRO ASA, Oslo (NO)

(72) Inventor: Roland Scharf-Bergmann, Grevenbroich (DE)

(73) Assignee: NORSK HYDRO ASA, Oslo (NO)

( * ) Notice: Subject to any disclaimer, the term of this patent is extended or adjusted under 35 U.S.C. 154(b) by 374 days.

(21) Appl. No.: 17/268,222

(22) PCT Filed: May 14, 2019

(86) PCT No.: PCT/EP2019/062344
§ 371 (c)(1),
(2) Date: Feb. 12, 2021

(87) PCT Pub. No.: WO2020/035181
PCT Pub. Date: Feb. 20, 2020

(65) Prior Publication Data
US 2021/0310099 A1      Oct. 7, 2021

(30) Foreign Application Priority Data

Aug. 15, 2018  (EP) ..................... 18189141

(51) Int. Cl.
*C22B 21/00*     (2006.01)
*C22B 1/00*      (2006.01)
*C22B 7/00*      (2006.01)
(52) U.S. Cl.
CPC .......... *C22B 21/0092* (2013.01); *C22B 1/005* (2013.01); *C22B 7/003* (2013.01); *C22B 21/0007* (2013.01)

(58) Field of Classification Search
CPC . C22B 1/005; C22B 21/0007; C22B 21/0069; C22B 21/0092; C22B 7/003; Y02P 10/20
(Continued)

(56) References Cited

U.S. PATENT DOCUMENTS 4,927,459 A      5/1990  Gardner et al.
5,470,559 A  *  11/1995  Grolman .................. C25C 3/08
                                                 423/489

(Continued)

FOREIGN PATENT DOCUMENTS

CN    106166560    11/2016
CN    107363074    11/2017

OTHER PUBLICATIONS

International Search Report and Written Opinion of the International Searching Authority issued Jun. 27, 2019, in International (PCT) Application No. PCT/EP2019/062344.
(Continued)

*Primary Examiner* — Jie Yang
(74) *Attorney, Agent, or Firm* — Wenderoth, Lind & Ponack, L.L.P.

(57) ABSTRACT

Method for producing thermally processed material (50), the method comprising providing material (35) to be thermally processed, providing carbon-containing scrap material (20) from an electrolysis cell (10) for the production of primary aluminium (15), introducing the material (35) to be thermally processed into a furnace (40), processing the carbon-containing scrap material (20) to produce a scrap fuel (55), and thermally processing the material (35) to be thermally processed in the furnace (40) using energy generated by burning the scrap fuel (55) such as to produce thermally processed material (50).

17 Claims, 1 Drawing Sheet

(58) Field of Classification Search
USPC .......................................................... 75/685
See application file for complete search history.

(56) References Cited

U.S. PATENT DOCUMENTS

| | | |
|---|---|---|
| 2005/0103159 A1 | 5/2005 | Ducrocq |
| 2012/0228127 A1 | 9/2012 | Wang et al. |
| 2021/0310099 A1* | 10/2021 | Scharf-Bergmann ........................ C22B 21/0069 |

OTHER PUBLICATIONS

Second Written Opinion of the International Searching Authority issued May 11, 2020, in International (PCT) Application No. PCT/EP2019/062344.

International Preliminary Report of Patentability issued Oct. 20, 2020, in International (PCT) Application No. PCT/EP2019/062344.

* cited by examiner

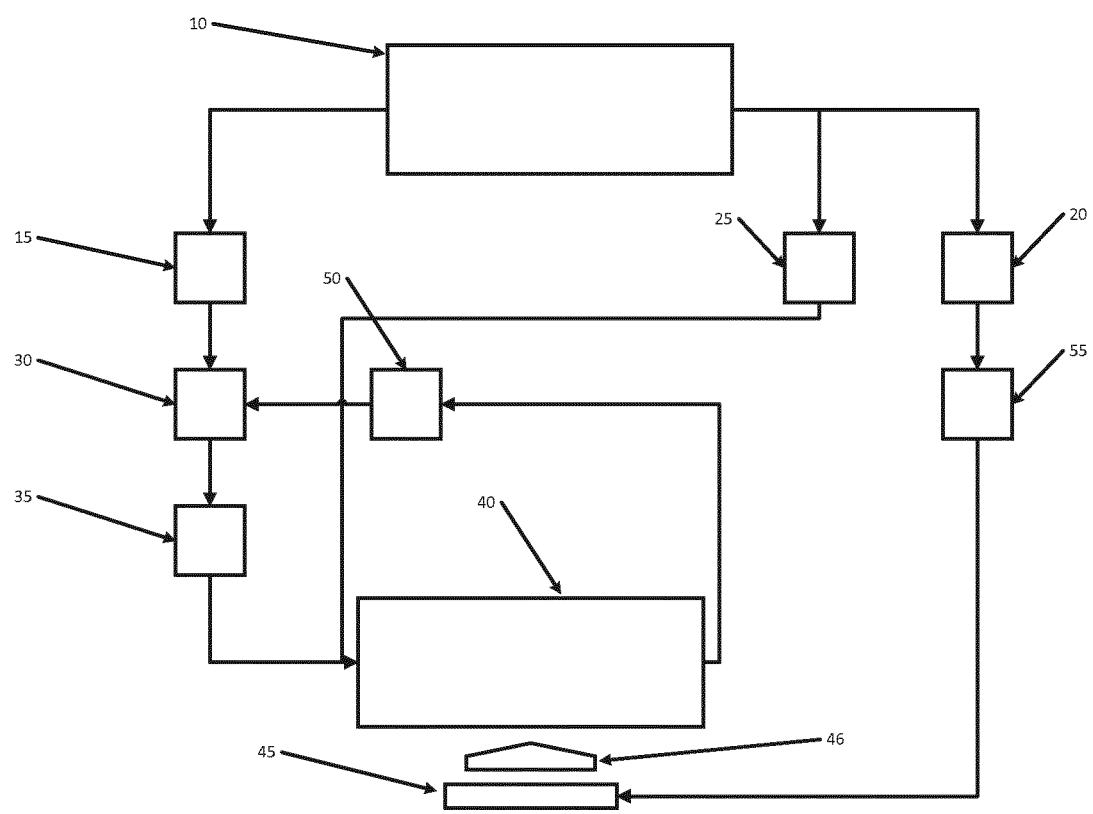

METHOD FOR PRODUCING THERMALLY PROCESSED MATERIAL

TECHNICAL FIELD

The present invention relates to a method for the production of secondary aluminium from scrap material by using a scrap obtained from an electrolysis cell as secondary/supplemented solid fuel for the production of primary aluminium.

BACKGROUND

Primary aluminium is generally produced by smelting alumina (aluminium oxide) in an electrolysis cell according to the Hall-Héroult process. Such an electrolysis cell generally has a casing with side walls and a bottom wall which are cladded with refractory material to form a reaction chamber. A carbon anode is provided on the top of the reaction chamber and a carbon cathode is provided on or near the bottom of the reaction chamber. Cathodes and anodes are also referred to as electrodes. In some electrolysis cells, carbon electrode material may also be present on sides of the reaction chamber. Cryolite and alumina are introduced into the reaction chamber, and when an adequate electric current passes between the cathode and the anode, the alumina is reduced to aluminium that accumulates in the bottom of the reaction chamber via the cathodic reaction taking place in the reaction chamber.

Secondary aluminium is generally produced by re-melting aluminium, for example aluminium end-of-life scrap (after a product has been discarded by the user) or aluminium process scrap that is generated when aluminium products are produced (for example by stamping out window openings in plates for vehicle doors). This process can be repeated over and over.

While producing secondary aluminium generally requires less energy than producing primary aluminium, the energy requirements are non-negligible. In secondary aluminium, often the metal quality decreases over each repetition due to deficiencies in sorting the material into pure fractions and as impurities that are inefficient to remove accumulate. Further, virtually all secondary aluminum in existence was initially produced as primary aluminium and due to the rising global demand for aluminium, not all demand can be met by secondary aluminium. That means that the production of primary aluminium will continue.

During the Hall-Héroult process, the carbon-containing parts of the electrolysis cell, i.e. the cathode and anode, or jointly the electrodes, degenerate ("are spent") and need to be replaced. As there is diffusion of atoms from the cryolite and from impurities in the alumina (aluminium oxide) into the carbon-containing parts of the electrolysis cell during the Hall-Héroult process, disposal of the degenerated carbon-containing parts of the electrolysis cell is difficult due to the risks for health and the environment posed by these parts.

From U.S. Pat. No. 4,927,459 it is known that in furnaces containing open flames in the furnace interior, spent potlining serves as a fuel supplement due to its carbon content. The patent further states that in such cases, the inclusion of the spent potlining permits one to maintain the desired temperature with the burner running at considerably less than its full capacity and that open-flame furnaces are preferred for purposes of converting certain otherwise dangerous contaminants in the spent potlinings to harmless gaseous oxides for collection in the flue gases and possible recovery. Cyanides for instance may be converted to carbon oxides and nitrogen oxides. However, the present inventor has found that such a method is not desirable, as contrary to the teaching of said patent, harmful residues remain in the dross that is produced inside the furnace chamber when the spent potlining is introduced into the furnace chamber. Accordingly, the present inventor has found that the teaching of said patent does not solve the problem of disposing spent potlining, but merely shifts the problem to the problem of disposing contaminated dross. Further, the present inventor has found that in particular when secondary aluminium is produced, the quality of the secondary aluminium is inferior when amounts of spent potlining that are large enough to significantly reduce the capacity at which the burner is run are introduced into the interior of a furnace. It is thought that this is caused by impurities in the spent potlinings.

It is therefore desirable to have an efficient method for disposing the degenerated carbon-containing parts of an electrolysis cell.

Further, a more efficient method for producing primary and secondary aluminium is desirable.

SHORT DESCRIPTION OF THE INVENTION

The present inventor has found that these and other objects can be achieved by producing a scrap/secondary fuel and by using the scrap fuel to thermally treat material as described in the following. Accordingly, the invention provides according to an aspect a method for producing thermally processed material, e.g. secondary aluminium, the method comprising providing material to be thermally processed, e.g. aluminium-containing scrap material, providing carbon-containing scrap material from an electrolysis cell for the production of primary aluminium, introducing the material to be thermally processed, e.g. the aluminium-containing scrap material, into a furnace, e.g. a rotary furnace, processing the carbon-containing scrap material to produce a scrap fuel, and thermally processing the material to be thermally processed, e.g. the aluminium-containing scrap material, in the furnace using energy generated by burning the scrap fuel such as to produce thermally processed material, e.g. secondary aluminium. The methods according to the invention may produce a tangible product and may exclude methods for generation of power, e.g. methods for generation of steam or electricity.

In particular and as described above, the present inventor has found that, in view of the whole process chain, aluminium can be produced more efficiently when secondary aluminium is produced by using process waste from the production of primary aluminium in a manner described in the following.

Accordingly, the present invention provides according to a further aspect a method for producing secondary aluminium, the method comprising providing aluminium-containing scrap material, for example having a first, lower, specific aluminium content, providing carbon-containing scrap material from an electrolysis cell for the production of primary aluminium, introducing the aluminium-containing scrap material into a rotary furnace, processing the carbon-containing scrap material to produce a scrap fuel, and melting the aluminium-containing scrap material in the rotary furnace using energy generated by burning the scrap fuel such as to produce secondary aluminium, for example having a second, higher, specific aluminium content.

Conventionally, the carbon-containing scrap material is deposited as waste in landfill sites.

According to embodiments of the invention, the carbon-containing scrap material may be obtained from the anode and/or the cathode of the electrolysis cell.

According to embodiments of the invention, the aluminium-containing scrap material may comprise dross from aluminium melting and casting.

According to embodiments of the invention, the aluminium-containing scrap material may comprise end-of-life aluminium scrap or process aluminium scrap.

According to embodiments of the invention, the aluminium-containing scrap material may comprise fluorine-comprising bath material from the electrolysis cell.

According to embodiments of the invention, the processing the carbon-containing scrap material may comprise mechanical processing including crushing and/or milling the carbon-containing scrap.

According to embodiments of the invention, the carbon-containing scrap may be mechanically processed such as to obtain particles having a size between 10 μm and 300 μm, in particular between 50 μm and 100 μm.

According to embodiments of the invention, the scrap fuel may be transported pneumatically into a flame of a burner for generating the energy for melting the aluminium-containing scrap material.

According to embodiments of the invention, the scrap fuel may be transported into a flame of a burner for generating the energy for melting the aluminium-containing scrap material while being dispersed in a liquid fuel, in particular oil.

According to embodiments of the invention, the burner may be operated at least partially using natural gas to generate the flame.

According to embodiments of the invention, with respect to the caloric value, at least 30%, in particular at least 50% of the energy for melting the scrap material may be provided by the scrap fuel.

According to embodiments of the invention, in addition to the aluminium-containing scrap material, chloride salt, in particular NaCl and/or KCl, and/or a fluoride salt, in particular $CaF_2$, may be introduced into the rotary furnace.

According to embodiments of the invention, a fluorine content in the rotary furnace is adjusted by adjusting a ratio of bath material to other aluminium-comprising scrap.

According to embodiments of the invention, oxygen with a purity of 50% or more, in particular 80% or more, may be used as an oxidant for burning the scrap fuel.

According to embodiments of the invention, air may be used as an oxidant for burning the scrap fuel.

According to embodiments of the invention, oxygen enriched air may be used as an oxidant for burning the scrap fuel.

According to embodiments of the invention, an off-gas from melting the aluminium-containing scrap material in the rotary furnace may be led into the flame of the burner for post-combustion.

According to embodiments of the invention, oxygen may be injected into the offgas stream for post combustion, either through the burner, or through a separate lance.

According to embodiments, the invention further provides a method for producing aluminium using a closed-loop mass flow (e.g. using a substantially closed-loop mass flow), the method comprising producing primary aluminium from alumina using an electrolysis cell, producing products from the primary aluminium and from secondary aluminium, obtaining aluminium-containing scrap material from the product (end-of-life scrap) or the production of the product (process scrap), obtaining carbon-containing scrap material form the electrolysis cell, and producing secondary aluminium form the aluminium-containing scrap material and the carbon-containing scrap material using the method described above.

According to embodiments, the method may further comprise obtaining bath material form the electrolysis cell and producing secondary aluminium form the aluminium-containing scrap material, the carbon-containing scrap material and the bath material as described above. Said bath material may be non-combustible.

The methods according to the invention facilitate that harmful components included in the carbon-containing scrap material from the electrolysis cell (e.g. spent potlinings) are separated from the material to be thermally processed and cannot contaminate the material.

While the methods according to the present invention are mainly described in view of producing secondary aluminium, the methods may be used for thermally processing any material in a furnace.

According to embodiments of the invention, the scrap fuel is not introduced into a chamber ("interior") of the furnace but is burned outside of the furnace. That is, according to embodiments of the invention, the scrap fuel does not come into contact with the material that is to be thermally processed, e.g. the aluminium-containing scrap material, that is located in (inside) the furnace, e.g. a furnace chamber thereof.

SHORT DESCRIPTION OF THE FIGURE

The FIGURE shows a schematic view of the method according to an embodiment of the invention.

DETAILED DESCRIPTION OF THE INVENTION

The method according to the invention produces secondary aluminium, that is, aluminium that is not directly produced from alumina, from aluminium-containing scrap material. With reference to FIG. 1, an electrolysis cell 10 produces primary aluminium 15 from alumina (not shown). Generally, this is achieved via the Hall-Héroult process involving the flow of an electric current from the cathode placed on the bottom side of the electrolysis cell through a reaction chamber of the electrolysis cell 10 to the anode placed on the upper side of the electrolysis cell 10. The reaction chamber is filled with alumina and cryolite ($Na_3AlF_6$) and optionally other additives such as lithium fluoride. The anode and the cathode both comprise carbon. While the anode is consumed at a higher rate than the cathode via the oxidation of carbon that takes place during the reduction of alumina, the cathode also deteriorates over time and must eventually be replaced. As both anode and cathode come into contact with fluorine or fluorine-comprising compounds in the reaction chamber, used (also called "spent") anodes and cathodes may comprise fluorine. According to the present invention, spent/used anodes and/or cathodes from the electrolysis cell 10 are referred to as carbon-comprising scrap material 20. A further byproduct of the production of primary aluminium in the electrolysis cell 10 is bath material 25, a mixture of impurities from the alumina, the cryolite/additives, impurities from the anode/cathode and the cell itself that accumulates on the upper side of the reaction chamber of the electrolysis cell 10 and is removed from time to time. The bath material 10 may comprise significant amounts of fluorine (F).

The primary aluminium 15 is used to produce products 30 such as cast products, sheet metal, extruded products and the like. Aluminium-containing scrap material 35 is obtained from process waste that is generated during production of the products 30 (process scrap) as well as from the products 30 themselves at the end of their lifetime (end-of-life scrap). Aluminium-containing scrap material 35 may also be obtained from dross generated while casting aluminium or from casting process scrap.

The aluminium-containing scrap material 35 is according to the invention introduced into a rotary furnace 40. The rotary furnace 40 is heated by a burner 45 such as to melt the aluminium-containing scrap material 35. The melting may result in a purification of the material in the rotary furnace with respect to the specific aluminium content, as organic compounds in the aluminium-containing scrap 35 such as lacquers and coatings are burned off and other impurities and oxides may accumulate in dross that forms on top of the melt in the rotary furnace 40 and can be separated from the melt. The melted and solidified material that is produced in the rotary furnace 40 is referred to as secondary aluminium 50, as it is—in contrast to primary aluminium—not directly produced from alumina.

The secondary aluminium 50 may be used like primary aluminium 15 to produce products 30 resulting in a substantially closed cycle with respect to the mass flow of aluminium. The cycle:
product 30→aluminium-containing scrap material 35→secondary aluminium 50-product 30→ . . .
may be repeated indefinitely in principle, however in practice some aluminium is lost during recycling, there are issues with the purity of secondary aluminum 50 in some applications, and the global demand in aluminium is rising so that on a global scale secondary aluminium 50 has to be supplemented by primary aluminium 15 to meet demand.

According to the invention, the carbon-comprising scrap material 20 is processed such as to obtain scrap fuel 55. The processing may include crushing and/or milling the carbon-comprising scrap material 20 such as to reduce the particle size. Depending on the design of a burner 45, an average particle size determined using the largest circle method (e.g. using a light optical microscope) of the scrap fuel 55 may be between 10 μm and 300 μm, in particular between 50 μm and 100 μm. While smaller average particle sizes have a better ratio of surface to volume than larger average particle sizes and therefore burn better in a flame of the burner 45, processing the carbon-comprising scrap material 20 is a resource-intensive and the stated average particle size of between 10 μm an 300 μm, in particular between 50 μm and 100 μm, is thought to be a good compromise between quality of the scrap fuel 55 and production efficiency of the scrap fuel 55. According to one embodiment that is thought to be particularly efficient in terms of processing effort while still producing particles having a favorable surface to volume ratio, the carbon-comprising scrap material 20 is milled such that an average particle size above or equal to 150 μm is obtained. Said milled material is then fed through a sieving means, e.g. a sieve, that allows particles having a diameter of 150 μm or smaller to pass through the sieving means to obtain a sieved fraction. The sieved fraction is then used as the scrap fuel 55. In case the particles are too large, the combustion speed is too low and the burner may get clogged resulting in a less effective use of combustion energy and more downtime. On the other hand, when the particles are too small, the cumulative energy balance deteriorates as too much energy was spent on mechanical processing the carbon-comprising scrap material 20.

The scrap fuel 55 is burned by the burner 45 to produce secondary aluminium 50 in the rotary furnace 40 by heating the carbon-containing scrap material 35. The heat produced by the burner 45 that heats the rotary furnace 40 is schematically shown by arrow 46 in FIG. 1. According to embodiments of the invention, the burner 45 is located outside of the furnace 40, e.g. rotary furnace 40. In other words, the burner 45 may be located outside of a furnace chamber of the furnace 40. According to embodiments of the invention, the scrap fuel 55 does not come into contact with the aluminium-containing scrap material 35 or the secondary aluminium 50. This also means that no spent potlinings come into contact with the material that is located inside the furnace 40 (e.g. inside the furnace chamber).

To improve the performance of the burner 45, the scrap fuel 55 may be supplemented by natural gas or by oil (petroleum) or hydrocarbons derived from gas/petroleum, such as diesel fuel, gasoline or otherwise processed petroleum.

The scrap fuel 55 may be blown into a flame of the burner 45 or the scrap fuel 55 may be mixed with the supplemented fuel. In case the supplemented fuel is a gas, a mixture of said gas and the particulate scrap fuel 55 may be incinerated to generate heat. In case the supplemented fuel is a liquid such as oil, the scrap fuel 55 may be dispersed in the liquid and the resulting dispersion may be incinerated to generate heat.

According to embodiments of the present invention, a rotary furnace 40 is used as the flame generated by the burner 45 has a high volume and generates a large amount of (heat) radiation caused by the solid scrap fuel 55. It has been found that a rotary furnace 40 has an optimal transfer area for transfer of the energy of the flame that is generated by the burner 45 burning the scrap fuel 55. Further, a rotary furnace 40 allows to utilize off-gas cleaning of the gases generated by the burner 45 and/or generated by melting the aluminium-comprising scrap material 35.

An off-gas (not shown in FIG. 1) that is produced by heating the aluminium-containing scrap material 35 in the rotary furnace 40 may be led to the burner 45 to be burned by the burner 45. This results in a cleaning of the off-gas, as harmful compounds in the off-gas are burnt. In case the off-gas comprises compounds that can be burned in an exothermic reaction (for example stemming from organic coatings or lacquers or plastics in the aluminium-containing scrap material 35), said compounds generate additional heat and improve the energy efficiency.

According to the invention, chlorine comprising salts, such as NaCl or KCl may be introduced into the rotary furnace 40 together with the aluminium-containing scrap material 35. It has been found that such an addition of chlorine comprising salts can increase the quality of the secondary aluminium 50 produced by the rotary furnace 40. It is thought that the mechanism involves an increased accumulation of high-melting intermetallics in the dross forming in the rotary furnace 40 caused by the chlorine salt additions.

According to the invention, fluorine-comprising bath material 25 may optionally also be introduced into the rotary furnace 40 together with aluminium-containing scrap material 35. It is thought that the fluorine from the bath material 25 reduces the surface tension of Al-droplets formed during melting in the rotary furnace 40 which results in the formation of droplets having a higher volume. The larger the droplets are, the less oxidation takes place on the surface of the droplets due to the geometric relationship of surface to volume. Further, fluorine may help in keeping the walls of the rotary furnace 40 clean. It is noted that the fluorine-comprising bath material 25 according to the present invention is not a spent potlining but is taken from the interior of an electrolysis cell.

In addition to or instead of bath material 25, optionally fluorine comprising salts such as $CaF_2$ and/or $Na_3AlF_6$ or other salts may be introduced into the rotary furnace 40 together with the aluminium-containing scrap material 35.

Accordingly, the present invention provides methods that enable an efficient production of secondary aluminium 50 by using waste material from the production of primary aluminium 15 in an electrolysis cell 10 that reduce energy consumption and reduce the amount of waste that is disposed in landfill sites.

The invention claimed is:

1. A method for producing secondary aluminium (50) in a thermal process, the method comprising
   providing aluminium containing scrap material (35) to be thermally processed,
   providing carbon-containing scrap material (20) from an electrolysis cell (10) for the production of primary aluminium (15),
   processing including crushing and/or milling the carbon-containing scrap material (20) to produce a scrap fuel (55) of an average particle size between 10 μm and 300 μm, wherein the carbon-containing scrap material (20) is not chemically processed,
   introducing the aluminium containing scrap material (35) into a rotary furnace (40) for thermal processing,
   thermally processing and melting the aluminium-containing scrap material (35) in the rotary furnace (40) using energy generated by the scrap fuel (55) being pneumatically transported into a flame of a burner (45) or while being dispersed in a liquid fuel, and
   burning the scrap fuel (55) such as to produce the secondary aluminium material (50).

2. The method according to claim 1, wherein
the carbon-containing scrap material (20) is obtained from an anode and/or a cathode of the electrolysis cell (10).

3. The method according to claim 1, wherein
the aluminium-containing scrap material (35) comprises dross from aluminium melting and casting.

4. The method according to claim 1, wherein the aluminium-containing scrap material (35) comprises end-of-life aluminium scrap or process aluminium scrap.

5. The method according to claim 1, wherein the aluminium-containing scrap material (25) comprises fluorine-comprising bath material from the electrolysis cell (10).

6. The method according to claim 5, wherein carbon-containing scrap material (20) is mechanically processed such as to obtain particles having an average size between 50 μm and 100 μm.

7. The method according to claim 5, wherein a fluorine content in the rotary furnace (40) is adjusted by adjusting a ratio of bath material (25) to other aluminium-comprising scrap (35).

8. The method according to claim 1, wherein the scrap fuel (35) is transported pneumatically into a flame of a burner (45) for generating the energy for melting the aluminium-containing scrap material (35).

9. The method according to claim 1, wherein the scrap fuel (55) is transported into a flame of a burner (45) for generating the energy for melting the aluminium-containing scrap material (35) while being dispersed in a liquid fuel.

10. The method according to claim 1, wherein, with respect to the caloric value, at least 30% of the energy for melting the aluminium-containing scrap material (35) is provided by the scrap fuel (55).

11. The method according to claim 1, wherein, in addition to the aluminium-containing scrap material (35), chloride salt and/or a fluoride salt is introduced into the rotary furnace (40).

12. The method according to claim 11, wherein the chloride salt is NaCl and/or KCl.

13. The method according to claim 11, wherein the fluoride salt is $CaF_2$.

14. The method according to claim 1, wherein an off-gas from melting the aluminium-containing scrap material (35) in the rotary furnace (40) is fed into the flame of the burner (45) for post-combustion.

15. A method for producing aluminium using a closed-loop mass flow, the method comprising
    producing primary aluminium (15) from alumina using an electrolysis cell (10),
    producing products (30) from the primary aluminium (15) and from secondary aluminium (50),
    obtaining aluminium-containing scrap material (35) from the product (35; end-of-life scrap) or the production of the product (35; process scrap),
    obtaining carbon-containing scrap material (20) from the electrolysis cell (10), and
    producing secondary aluminium (50) from the aluminium-containing scrap material (35) and the carbon-containing scrap material (20) using the method according to claim 1.

16. The method according to claim 1, wherein the scrap fuel (55) is transported into a flame of a burner (45) for generating the energy for melting the aluminium-containing scrap material (35) while being dispersed in oil.

17. The method according to claim 1, wherein, with respect to the caloric value, at least 50% of the energy for melting the aluminium-containing scrap material (35) is provided by the scrap fuel (55).

* * * * *